April 6, 1926.  
F. W. LARKWORTHY  
MEANS FOR STEERING CREEPER TRACTORS  
Filed Nov. 20, 1925  
1,579,372  
2 Sheets-Sheet 1
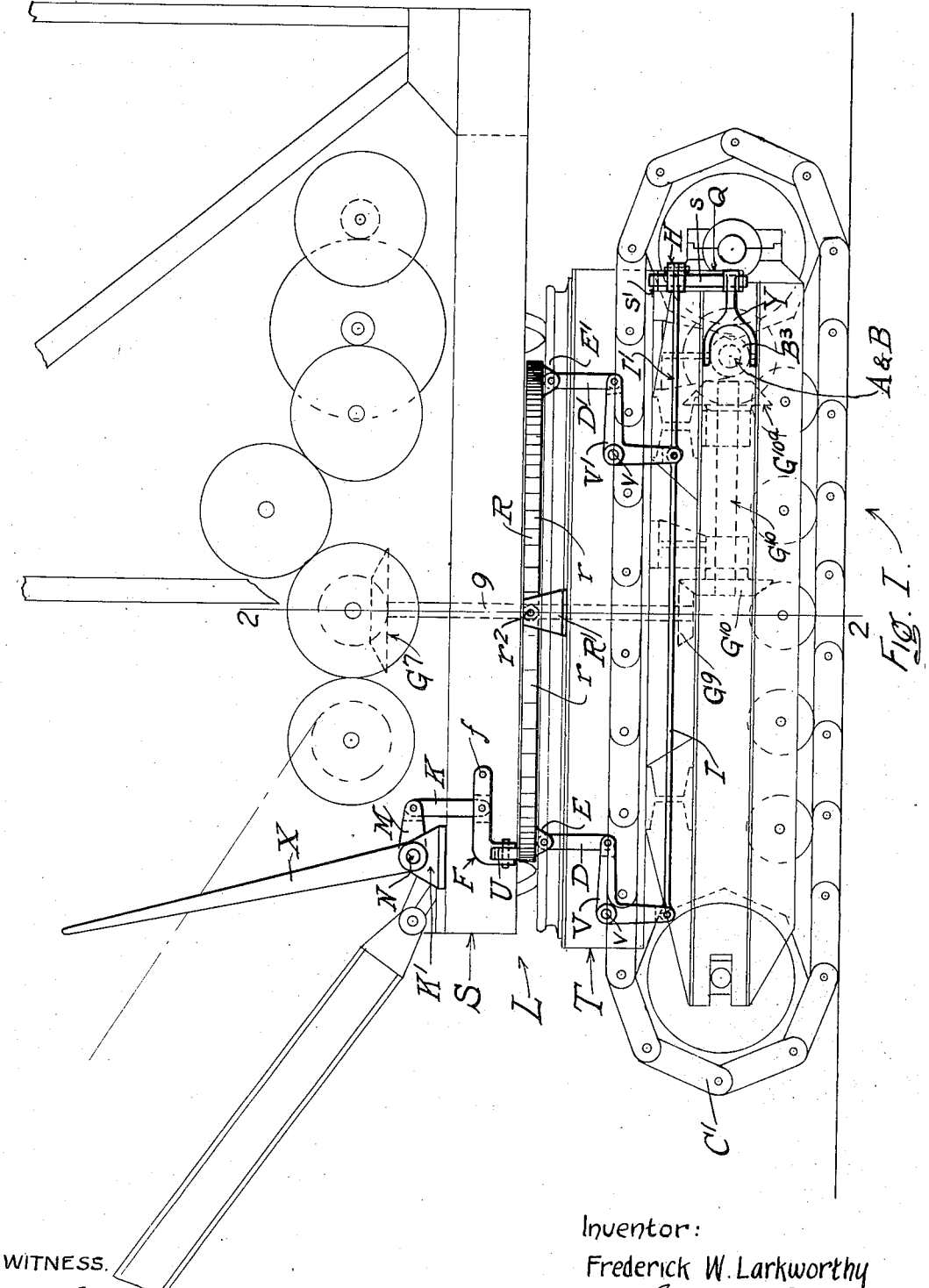
WITNESS.
Inventor:
Frederick W. Larkworthy
By George C. Ding
His Attorney April 6, 1926.　　　　　　　　　　　　　　　1,579,372
F. W. LARKWORTHY
MEANS FOR STEERING CREEPER TRACTORS
Filed Nov. 20, 1925　　　2 Sheets-Sheet 2
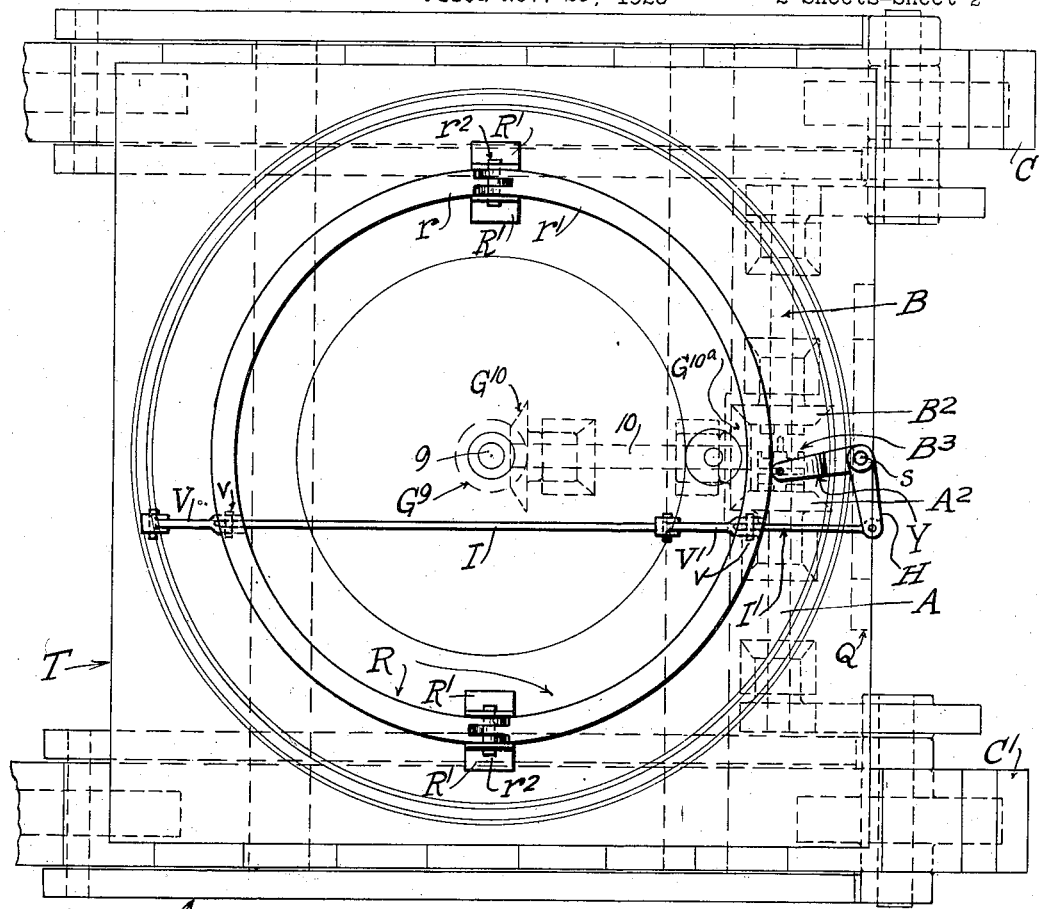
Fig II
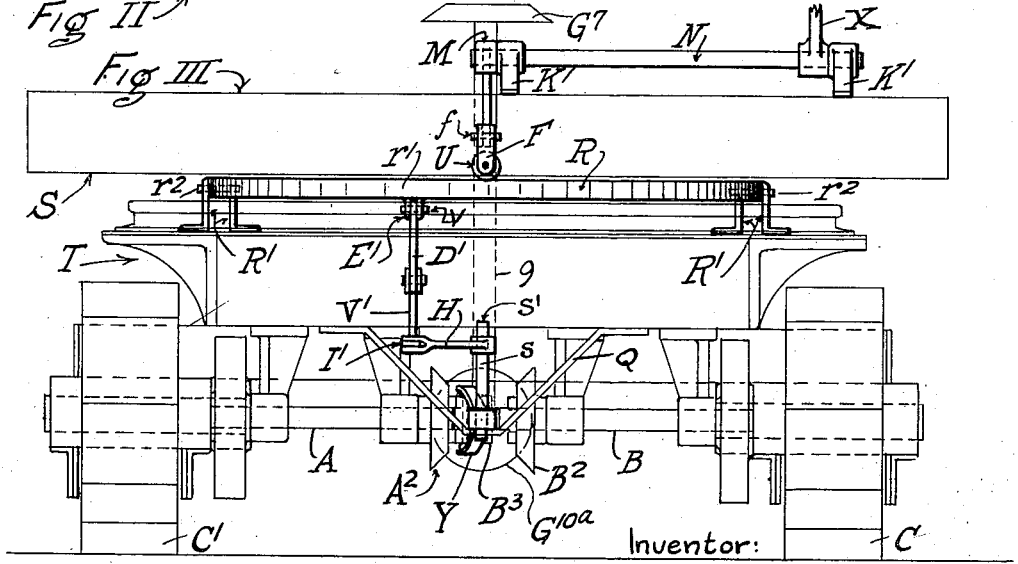
Fig III
Inventor:
Frederick W. Larkworthy.
By George C. Ding
His Attorney
WITNESS:

Patented Apr. 6, 1926.

1,579,372

UNITED STATES PATENT OFFICE.

FREDERICK W. LARKWORTHY, OF CLEVELAND, OHIO, ASSIGNOR TO THE BROWN HOISTING MACHINERY COMPANY, OF CLEVELAND, OHIO, A CORPORATION.

MEANS FOR STEERING CREEPER TRACTORS.

Application filed November 20, 1925. Serial No. 70,307.

*To all whom it may concern:*

Be it known that I, FREDERICK W. LARKWORTHY, a citizen of the United States, residing at Cleveland, county of Cuyahoga, and State of Ohio, have invented a new and useful Improvement in Means for Steering Creeper Tractors, of which the following is a clear and exact description, reference being made to the accompanying drawings, which form a part of the specification, and wherein the same parts are designated by the same letters and numerals in each case.

The invention relates to revolvable tractors of the endless belt type, and more particularly to tractors of that kind in which clutches are utilized for controlling the transmission of power to the traction elements at opposite sides thereof, whereby the steering of the same is effected through the manipulation of such clutches.

In an application filed by me under date of April 23, 1924, and bearing Serial Number 708,462, I showed and described drawings and specifications to a certain extent similar to those herein, and founded and declared definite claims upon the figures and explanations as deemed relevant.

Under the rules of the Patent Office, however, certain of these claims were found to include a second alleged invention, and presentable only in a separate application.

In accordance with such requirements, therefore, I have filed this application, and, as to all matters herein shown and described but not claimed, and which are claimed in said application dated April 23, 1924, and serially numbered 708,462, I hereby disclaim the same in favor of said former application and as constituting no part of the invention sought to be secured by the present application.

The principal object of the invention, for which a patent is now asked, is to provide means for actuating the steering clutch from revolvable superstructures, such as used in connection with locomotive-cranes and steam-shovels, without having to rotate the superstructure to a given or initial relation with the tractor proper.

The mechanisms shown in the drawings herewith meet the above objective, and the claims, as drawn, are intended to cover all tractors to which the mechanisms are applicable, whether such tractors are used as towing instrumentalities for vehicles of any description, farm implements, etc., or whether they are employed to support the revolving superstructures of locomotive cranes, steam-shovels and the like.

In the accompanying drawings, Figure I is a side elevation of a tractor embodying a specific application of the invention in connection with a locomotive-crane superstructure, shown in fragmentary outline.

Figure II is a plan view of the tractor proper with the superstructure removed, and Figure III is an end view of the tractor with a portion of the superstructure indicated. In the latter figure the superstructure has been changed from the relation shown in Fig. I by a half revolution about the vertical axis of rotation.

For the purpose of disclosing the present invention, I have chosen to show it, in the figures, as applied to a creeper-trunk-locomotive-crane of a kind familiar in the trade, and to a degree that obviates the need of here going into a detailed description of the same generally.

Of details that involve the invention more specifically, L refers to the crane as a whole, and T to the tractor. S is the locomotive-crane superstructure. It is adapted to rotate about the axis 2—2, Fig. I. C and $C^1$ are the creeper-belts, or self-laying tracks. The prime mover or source of power, it will be understood, is located on the rear of the superstructure S, and actuates the various gears required in the functioning of the crane. Among these gears is a horizontal gear $G^7$ mounted at the upper end of a vertical shaft 9 whose axis is coincidental with the axis of rotation 2—2. The shaft 9 extends downwardly through the superstructure S into the truck T to a sufficient distance to allow a bevel gear $G^9$, at its lower end, to mesh with or engage a gear $G^{10}$ on a horizontal shaft 10. Said shaft 10 extends rearwardly from the axis of rotation and has an upright bevel gear $G^{10a}$ keyed to its rearward end. The last named gear is in mesh with right and left bevel gears $A^2$ and $B^2$ duly mounted on transverse shafts A and B which pertain to the trains of gears leading to the driving belts C and $C^1$. A jaw clutch $B^3$ is slidably mounted intermedially of the bevels $A^2$ and $B^2$ and is arranged to engage the same when actuated for the purpose from its normal neutral position between said gears.

A vertical lever shaft $s$, whose upper end engages the truck at $s^1$, and whose lower end is supported by a bent-bar Q, is located at the rear of the jaw-clutch $B^3$; it carries a clutch operating yoke Y fixedly attached at its lower end, and a fixed lever arm H at a predetermined point above.

In order to actuate the various parts above pointed out for their designed movements, from the operator's place upon the revolvable superstructure, and thereby to remotely control the direction the tractor is to take from time to time, I provide a diametrically bisected ring R, made up of two sections $r$ and $r^1$, horizontally disposed on the top of the tractor T, concentrically of the axis of rotation 2—2. The sections $r$ and $r^1$ are pivotally mounted on pairs of supports $R^1$, $R^1$, and $R^1$, $R^1$ by transverse pins $r^2$.

On the underside of the ring sections $r$ and $r^1$, in alignment one with the other, and at one side of the longitudinal center line of the tractor and center of rotation, are depending ears E and $E^1$. These ears respectively support depending links D and $D^1$ that are connected at their lower ends to the horizontal arms of right angled bell crank levers V, $V^1$; the levers V and $V^1$ are in line with the ears and are pivotally fastened to the tractor body by pins $v$, $v$. The vertical arms of the bell-crank levers V and $V^1$ extend downwardly from the pins $v$, $v$ to a suitable distance to meet the elevation of the lever arm H. A lever connecting rod I engages the lower end of the vertical arm of the bell-crank V and extends backwardly to the lower end of the vertical arm of the bell-crank lever $V^1$ to which it is pivotally fastened. A second rod $I^1$ extends from the lower end of the vertical arm of the lever $V^1$ rearwardly to the outer end of the lever arm H to which it is operatively connected.

At the forward end of the superstructure S, below the floor line and, on the longitudinal center line thereof, is an angular shaped lever arm F. This lever is pivoted to the superstructure at $f$, and extends forwardly with its angular turn directed downwardly over the ring R; its downwardly projecting portion is bifurcated to receive a roller U. A link K, extending from the lever F to which it is connected just forward of the fulcrum $f$, projects upwardly through the floor of the superstructure to a height to meet the elevation of a transverse lever shaft N, located forward of the link K. The shaft is supported by bearings $K^1$, $K^1$, and extends from the longitudinal center line of the tractor to the operator's station at the front of the crane. A lever arm M is shown as fixed upon the inner end of the lever shaft N and extending backwardly to the vertical link K, to which it is pivotally connected. A hand-lever X is fastened to the outer end of the lever shaft K, of sufficient height to be within easy reach of the operator.

The operation of the remote control system, thus provided, for actuating the clutch $B^3$ will be apparent upon referring to the drawings and, particularly, to Fig. I thereof. By pulling the lever X toward the rear of the crane, the shaft N will rotate and carry the arm M with it; this, in turn, through the link K, will thrust the lever arm F downwardly and thereby cause the section $r$ to rotate about the pivotal points $r^2$ and, through the medium of the link D, to depress the horizontal arm of the lever V. The movement of the vertical arm of the lever V thus brought about, will exert a pulling force upon the rods I and $I^1$, which, by reason of their connection together at the vertical arm of the lever $V^1$, and the fixed connection of the rod $I^1$ to the lever H, will actuate the clutch-yoke Y, whereby, according to the degree of movement the operator imparts to the ring sections $r$ or $r^1$, as the case may be, the clutch $B^3$ may be moved into or out of engagement with the gear $A^2$ or the gear $B^2$, or to a neutral position between the two.

As will be obvious that because of the pivotal connections to the pairs of supporting members $R^1$, $R^1$, and $R^1$, $R^1$, there will be a limited portion in the rotatory travel of the superstructure S, where the means herein shown for controlling the clutch $B^3$ will necessarily be inoperative. The range of the remote control of the clutch is, nevertheless, sufficiently flexible for all practical purposes.

Having thus described my said invention as embodied in a concrete form and application, what I claim and wish to protect by Letters Patent is:—

1. In a locomotive crane of the endless belt type, characterized by a revolvable superstructure, a source of power located thereon, and means for transmitting such power to belt-driving sprocket mechanism below, which said mechanism is adapted to be actuated by said power to operate the sprockets simultaneously, or separately, according as clutch mechanism on the tractor for the purpose is moved into certain designed relations with said sprocket mechanism, a means for actuating said clutch mechanism into said, or any of said, designed relations, comprising the combination of a diametrically bisected ring horizontally disposed on the tractor concentrically of the axis of rotation of said superstructure, and having its two sections pivoted to said tractor, and a lever actuated system of connections between predetermined points on the tractor beneath said sections and said clutch mechanism, substantially as shown and described.

2. In a locomotive crane of the endless belt type, characterized by a revolvable superstructure, a source of power thereon, and means for transmitting such power to belt-driving sprocket mechanism below, which said mechanism is adapted to be actuated by said power to operate the sprockets simultaneously, or separately, according as clutch mechanism on the tractor for the purpose is moved into certain designed relations with said sprocket mechanism, a means for actuating said clutch mechanism into said, or any of said, designed relations, comprising the combination of a diametrically bisected ring horizontally disposed on the tractor concentrically of the axis of rotation of said superstructure and having its two sections pivoted to said tractor, a lever-actuated system of connections between predetermined points on the tractor beneath said sections and said clutch mechanism, and means on the superstructure for depressing said sections around their pivots into actuating contact with said system beneath, substantially as shown and described.

3. In a locomotive crane of the endless belt type, having a revolvable superstructure, a source of power located thereon, means for transmitting such power to a vertically arranged bevel gear located at a point in the truck intermediate of the sides of the same coincidentally arranged cross-shafts, extending outwardly from said bevel gear, provided with driving gears on their outer ends in mesh, respectively, with gears rigidly connected to the axles of the belt-driving sprockets of the crane, a bevel gear fixedly mounted on the inner end of one of said cross-shafts in mesh with said vertically arranged gear, a bevel gear loosely mounted on the inner end of the other of said cross-shafts in mesh with said vertically arranged gear, clutch mechanism intermediate of, and in operative relation to, said bevel gears last above named, the combination of a diametrically bisected ring horizontally disposed on the tractor concentrically of the axis of rotation of said superstructure and having its two sections pivoted to said tractor, a lever-actuated system of connections between predetermined points on the tractor beneath said sections and said clutch mechanism, and means on the superstructure for depressing said sections around their pivots into actuating contact with said system beneath, substantially as shown and described.

In testimony whereof I hereunto affix my signature.

FREDERICK W. LARKWORTHY.